Feb. 4, 1936.     E. J. KINGSBURY     2,030,007
FEED MECHANISM FOR MACHINE TOOL UNITS
Filed Aug. 2, 1932     8 Sheets-Sheet 1
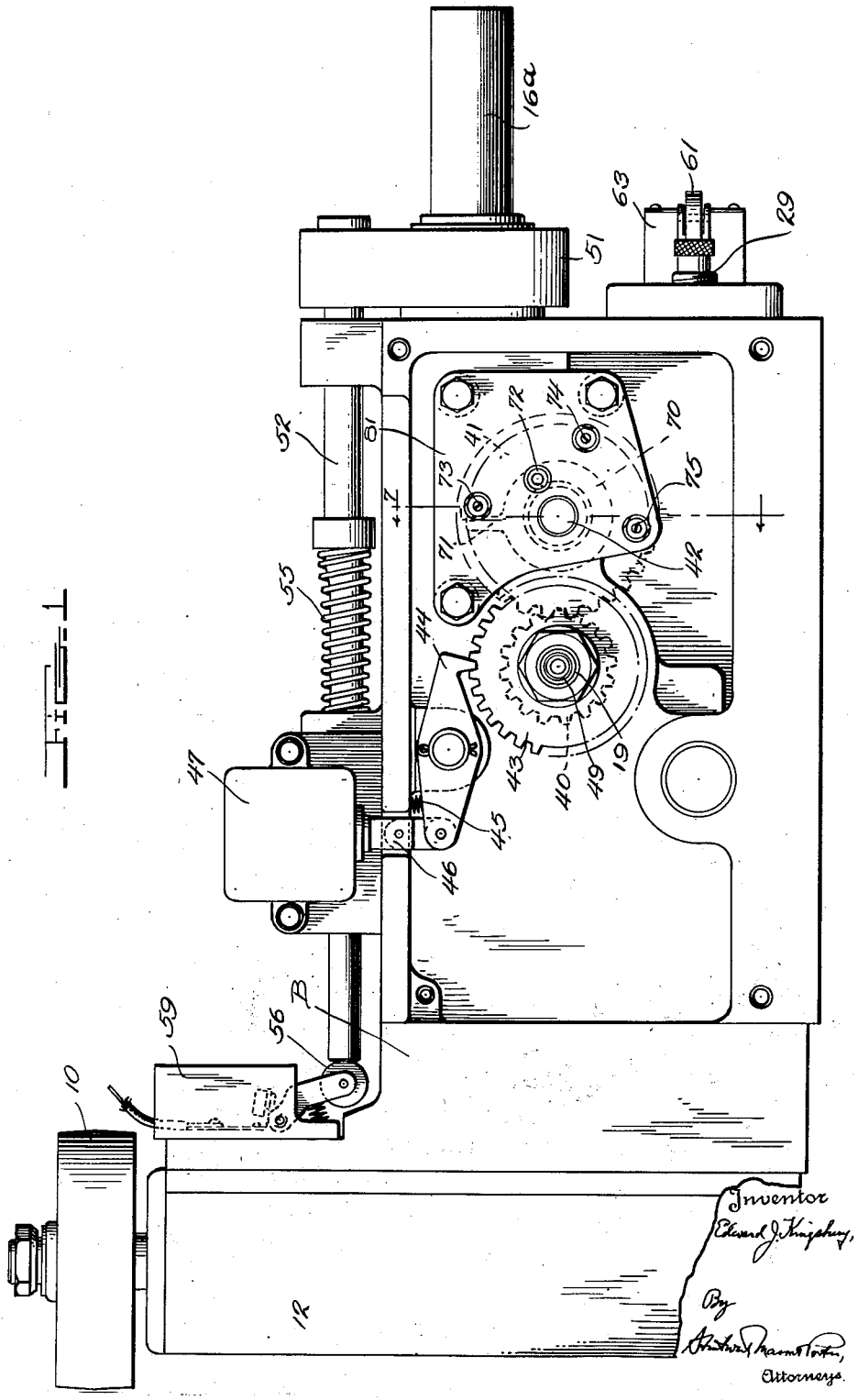

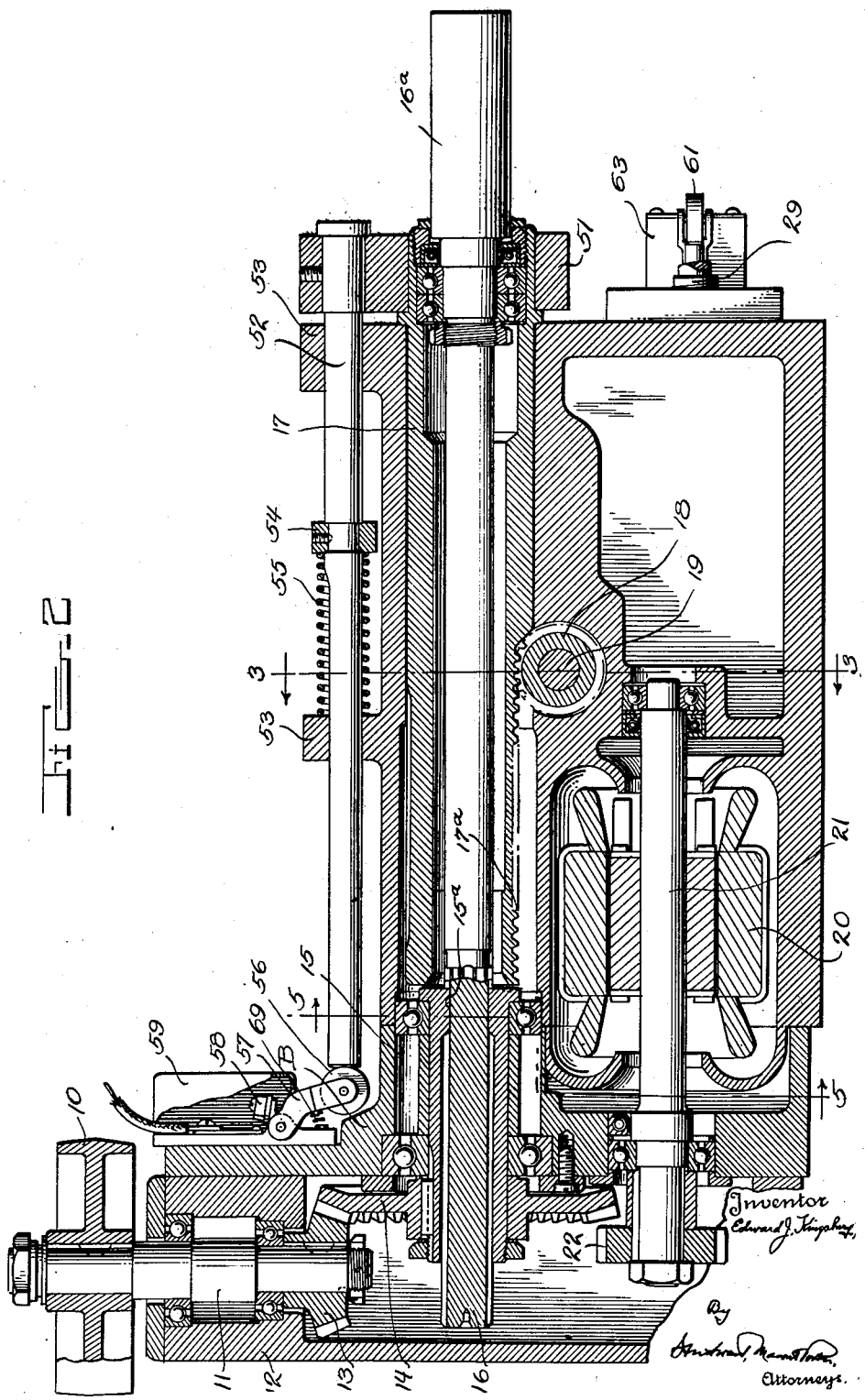

Feb. 4, 1936.   E. J. KINGSBURY   2,030,007
FEED MECHANISM FOR MACHINE TOOL UNITS
Filed Aug. 2, 1932   8 Sheets-Sheet 3
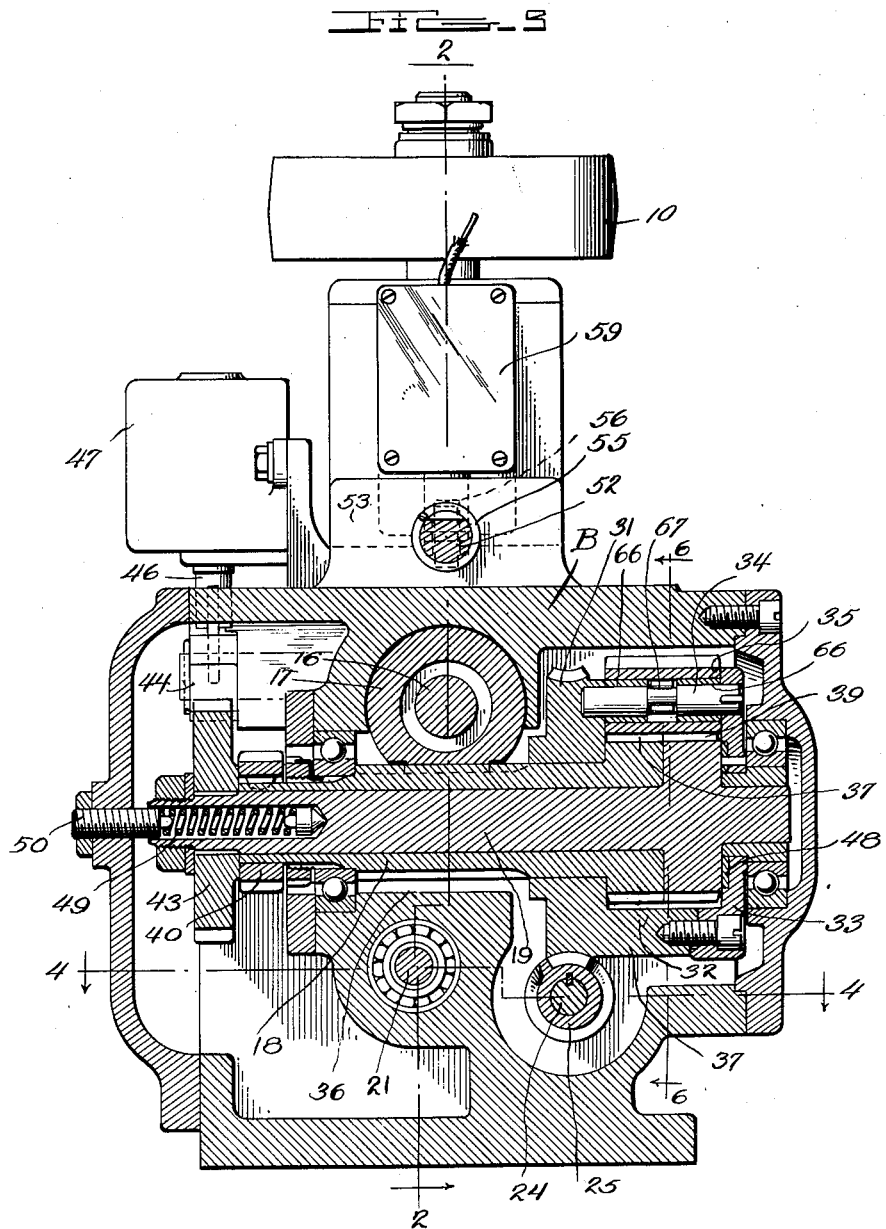

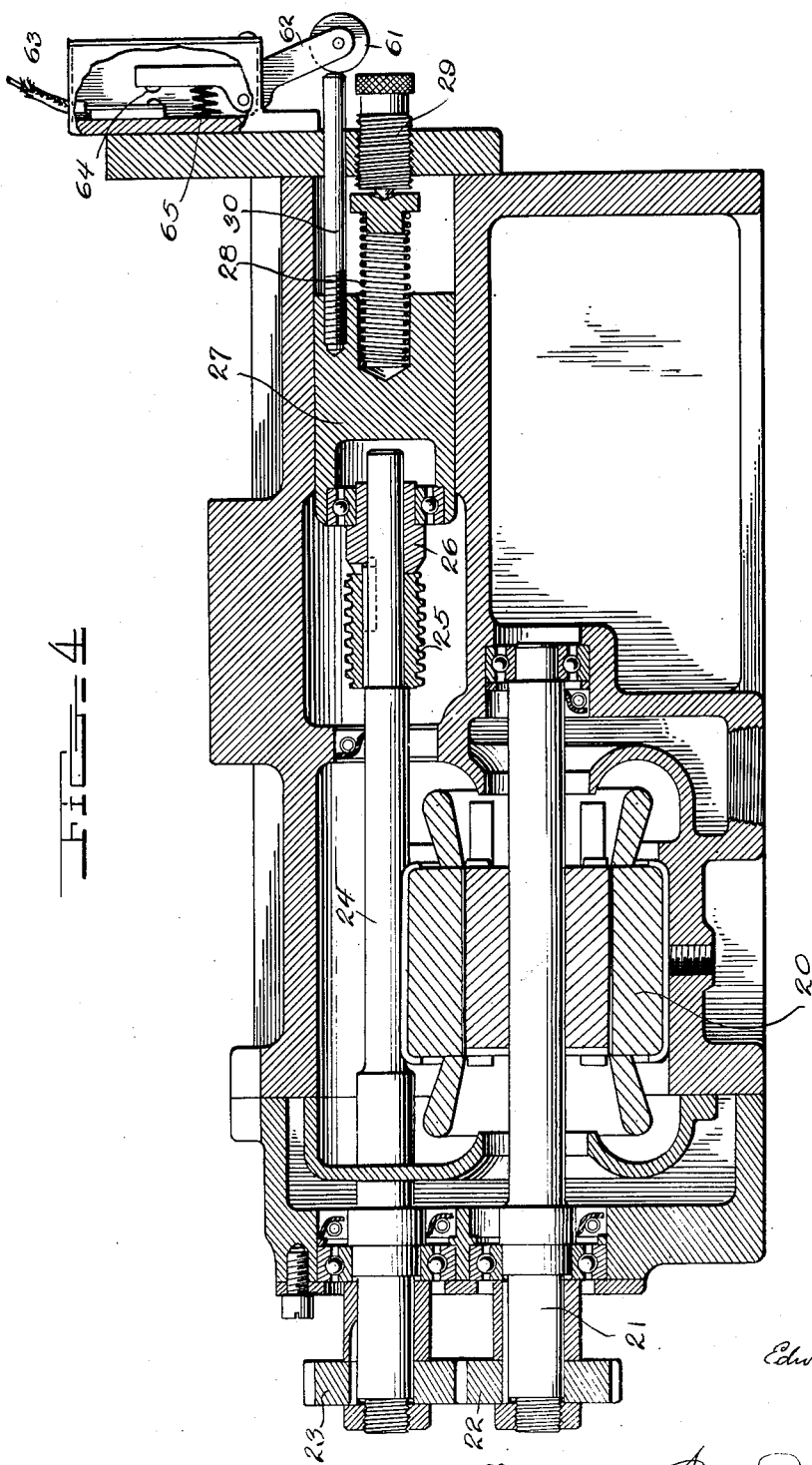

Feb. 4, 1936. E. J. KINGSBURY 2,030,007
FEED MECHANISM FOR MACHINE TOOL UNITS
Filed Aug. 2, 1932 8 Sheets-Sheet 5
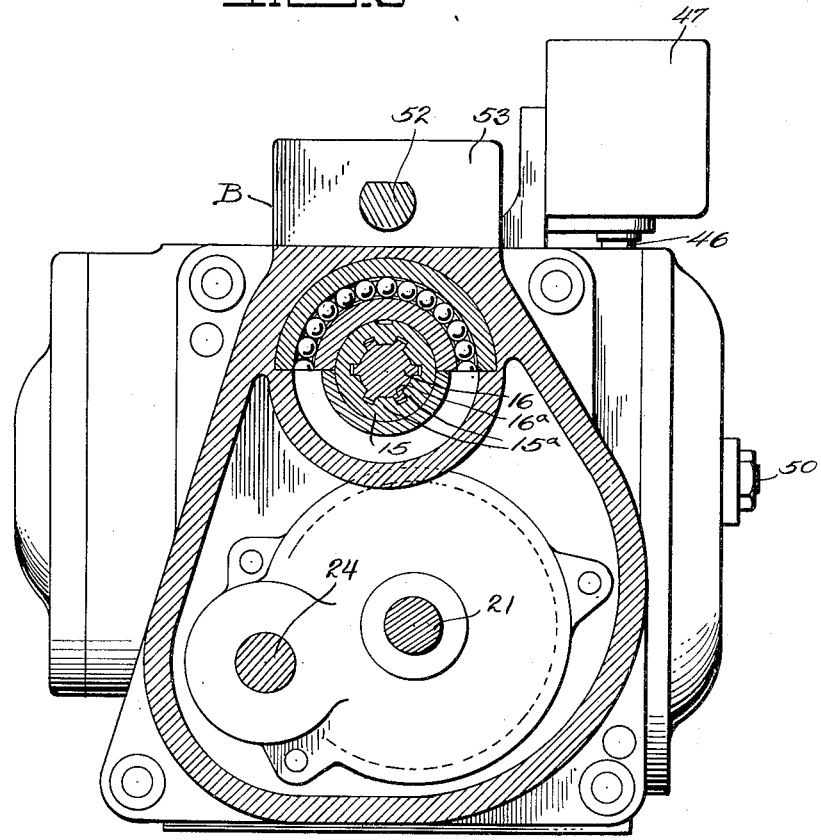
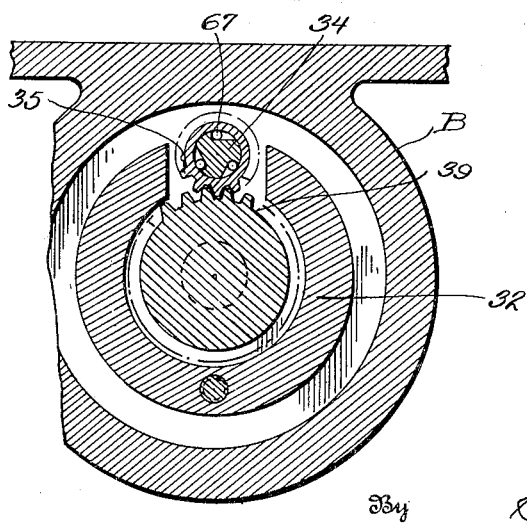
Inventor
Edward J. Kingsbury,
By
Attorneys.

Feb. 4, 1936. E. J. KINGSBURY 2,030,007
FEED MECHANISM FOR MACHINE TOOL UNITS
Filed Aug. 2, 1932 8 Sheets-Sheet 6
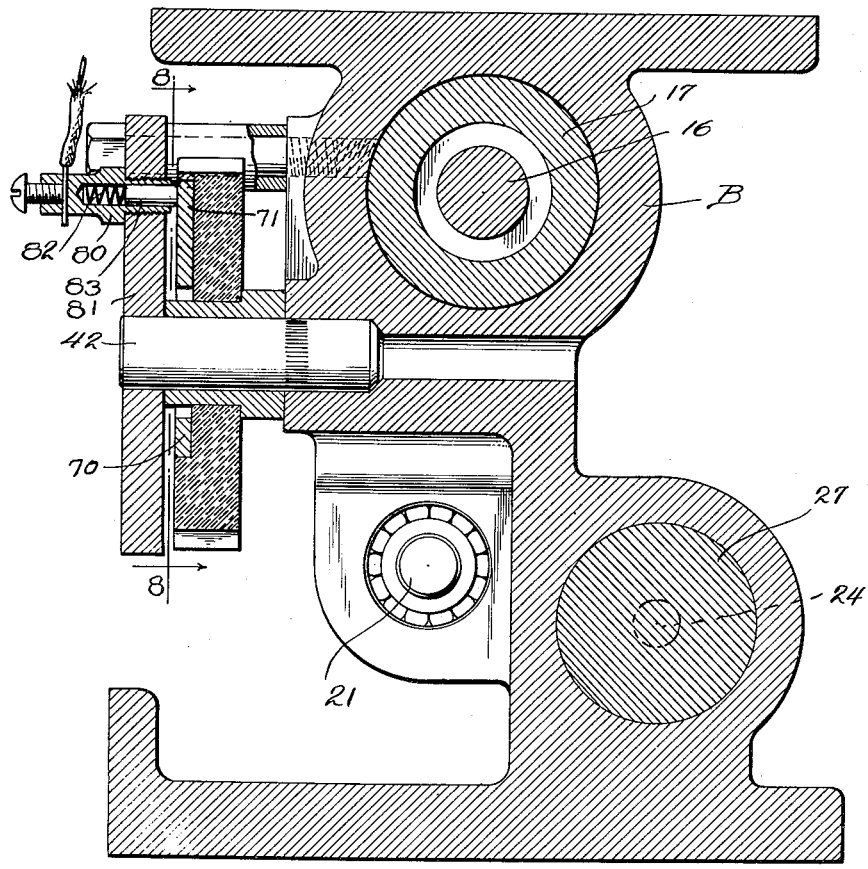
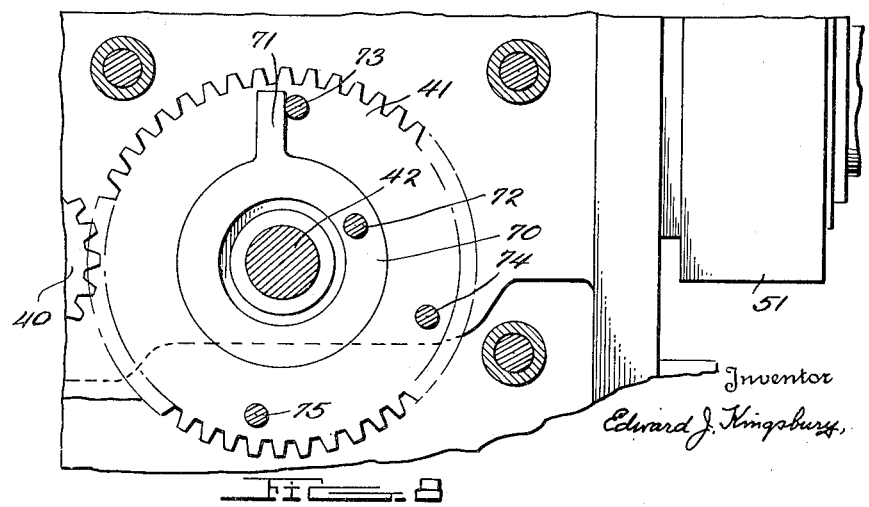
Inventor
Edward J. Kingsbury,
By
Attorneys.

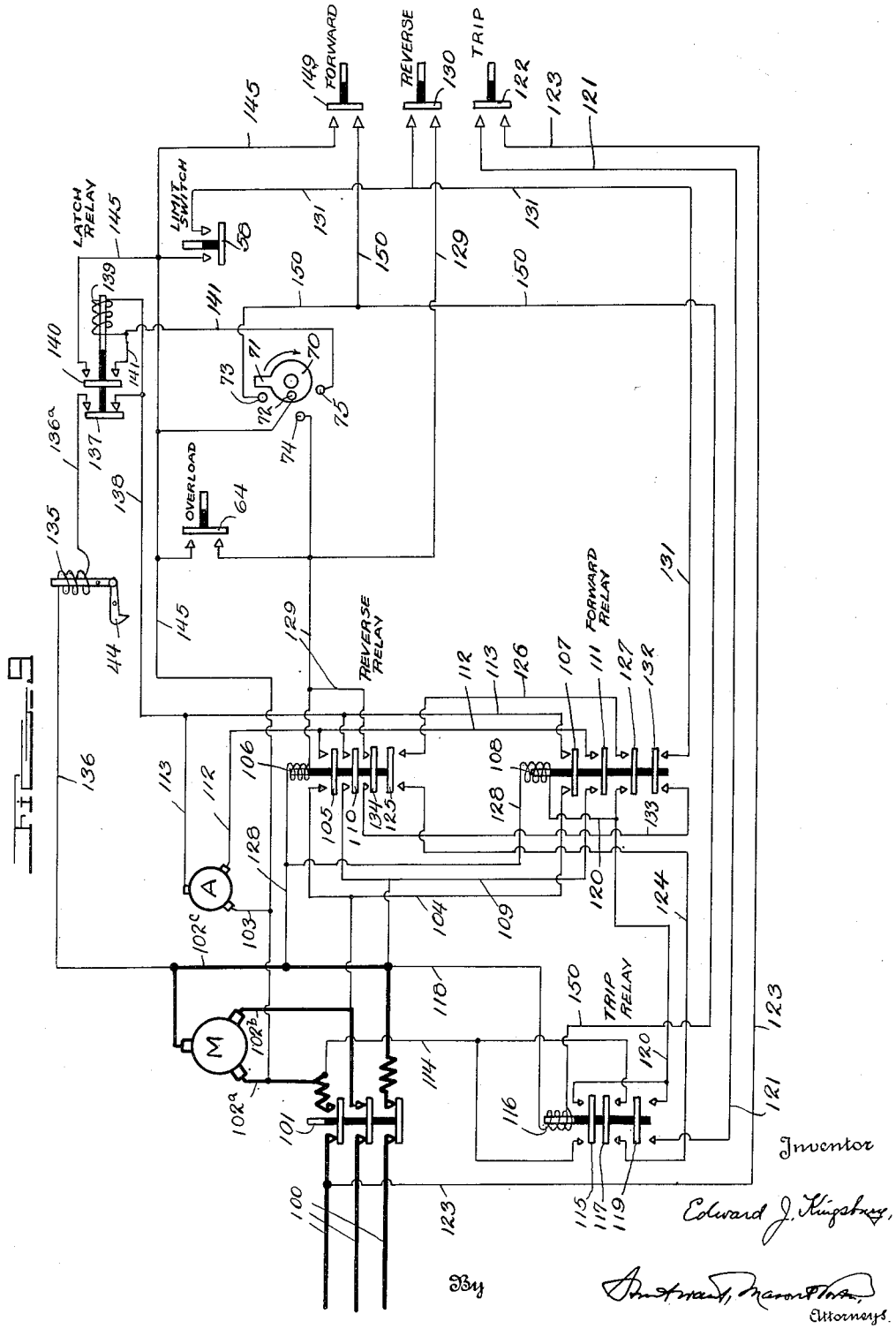

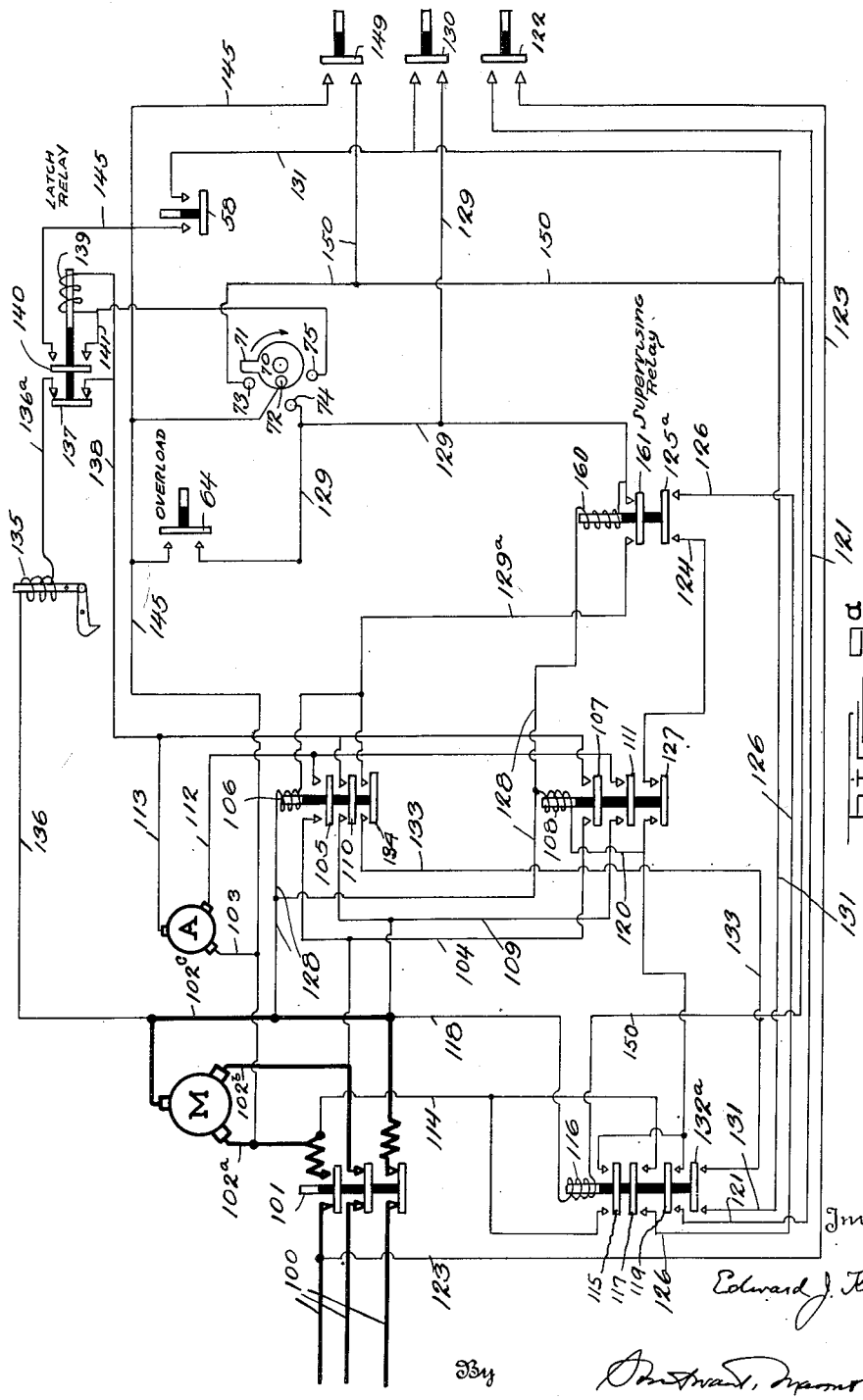

Patented Feb. 4, 1936

2,030,007

UNITED STATES PATENT OFFICE 2,030,007

FEED MECHANISM FOR MACHINE TOOL UNITS

Edward Joslin Kingsbury, Keene, N. H.

Application August 2, 1932, Serial No. 627,284

24 Claims. (Cl. 77—32)

The present invention relates to improvements in feed mechanism for machine tool units of the type employing a tool which operates by reciprocating action with respect to a fixed frame member.

One of the features of the present invention is the provision of means for affording a flexible feed which is simple and easily adjusted to various conditions of initial and working feeds.

Another feature of the present invention is the provision of an overload release for such a feed mechanism, which may easily be adjusted as to the point of slippage under overload.

A further feature of the present invention is the provision of an overload release for a feed mechanism, including means for accomplishing a withdrawal of the tool upon overload release.

Still another feature of the present invention is the provision of a planetary intermesh system with locking elements for accomplishing a rapid initial and slow working feed.

Still another feature of the present invention is the provision of means for controlling the initial and working feeds by a device which is operated in unison with the tool movement.

With these and other objects in view as will appear in the course of the following specification and claims an illustrative form of construction of device in accordance with the present invention is set forth in the accompanying drawings, in which:

Fig. 1 is a side elevation of the tool unit with side plate removed;

Fig. 2 is a vertical longitudinal section of the same substantially on line 2—2 of Fig. 3;

Fig. 3 is a transverse vertical sectional view substantially on line 3—3 of Fig. 2;

Fig. 4 is a horizontal sectional view substantially on line 4—4 of Fig. 3;

Fig. 5 is a transverse vertical sectional view substantially on line 5—5 of Fig. 2;

Fig. 6 is a fragmentary longitudinal vertical sectional view substantially on line 6—6 of Fig. 3;

Fig. 7 is a transverse vertical sectional view substantially on line 7—7 of Fig. 1;

Fig. 8 is a longitudinal vertical fragmentary sectional view substantially on line 8—8 of Fig. 7;

Fig. 9 is a circuit diagram of the electrical connections arranged in one manner;

Fig. 9a is a similar diagram, with the connections arranged in another manner.

In these drawings, the machine tool is illustrated as a drilling unit having a quill which is fed forward for a rapid initial and a slow working feed, and returned to withdrawn position.

The spindle for the drill is rotated from one driving system. A second driving system is connected for effecting the feeding movement. Limit devices are provided and in addition thereto a control system is employed and connected for movement in unison with the tool so that it operates to determine the rapid initial feeding, the slow working feeding and a rapid withdrawal from fed position. An overload release is provided whereby the unit is relieved of feed upon an overload, and a connection between this release and the second driving system permits a withdrawal of the tool upon overloading.

In the drawings, the first driving system is illustratively represented as including a pulley 10, which may be driven from any desirable external source of power such as an electric motor (not shown). This pulley 10 (Fig. 2) is connected to a vertical shaft 11, supported by bearings in an end housing 12 of the unit frame. The shaft 11 is provided with a bevel gear 13 at its lower and inner end, which is engaged with a bevel gear 14 fixed to a hollow shaft 15 journaled within the main body B of the unit frame. The hollow shaft 15 has internal teeth 15a which mesh in grooves of an axially ribbed spindle 16, so that the hollow shaft and spindle turn together at all times and a permissive relative axial movement of the tool may be accomplished. The spindle 16 terminates in a head 16a external to the unit frame for connection to a drill. The spindle 16 is journaled adjacent its head 16a in bearings carried by the quill 17, so that the spindle may rotate inside the quill, but is supported against relative axial movement with respect thereto. The quill is provided with rack teeth 17a for engagement by the feeding gear teeth 36 on a hollow shaft 18 mounted around a transverse spindle 19.

Mounted in a cavity of the frame body B is a feed motor 20, constituting in the illustrated assembly the second driving system and operating to effect the feeding and withdrawal of the tool. The shaft 21 of the armature 20 of an auxiliary motor extends parallel to the spindle 16 and is suitably journaled in the body B, and carries fixed thereto a gear 22 (Figs. 2 and 3) which is in mesh with a gear 23 on a longitudinal shaft 24, likewise journaled in the frame body B. A worm 25 is keyed to shaft 24 so that it turns in rotation therewith but has a relative permissive axial movement with respect thereto. This worm 25 (Fig. 4) is normally forced toward the left by a pressure member 26 rotatably mounted in a plunger 27 which is pressed by a spring 28 for forcing the worm 25 toward the left. The pressure of spring 28 may be regulated by an externally accessible screw threaded member 29. The plunger 27 is provided with an externally projecting push rod 30 for operating an overload switch, as will be described in detail hereinafter.

In Fig. 3 it will be noted that the worm 25 is in mesh with worm gear teeth 31 on a hollow planetary body member 32, which has an end closing plate 33 fixedly connected therewith. The body member 32 and the closing plate 33 are provided with a fixed shaft 34, upon which is mounted a planet pinion 35. Extending within the cavity of the planetary body member 32, is the hollow shaft 18 having for example, twenty-eight gear teeth 37 thereon in mesh with the planet pinion 35. Within the hollow shaft 18 is the spindle 19 having, for example, twenty-seven gear teeth 39 thereon, which likewise are in mesh with the planet pinion 35. The whole assembly is supported by suitable bearings in the frame body B. The hollow shaft 18 is provided with gear teeth 36 in mesh with the rack teeth 17a of the quill. This hollow shaft 18 is keyed at its end to a gear 40 which meshes (Figs. 1 and 8) with a gear 41, loosely rotatable about a pin 42 (Fig. 7). The gear 41 is preferably of insulating material, as will be described hereinafter. The spindle 19 is keyed at its end to a gear 43, serving as a stop ratchet when engaged by a pawl 44 (Fig. 1) which normally is held out of engagement by a spring 45, but may be pulled into engagement by the plunger 46 of a solenoid 135 in a housing 47. The end plate 33 of the planetary body is illustrated as provided with a friction shoe 48 for axial engagement with the spindle 19. A spring 49 forces the spindle 19 into frictional engagement with the shoe 48, and the action of this spring 49 may be regulated by an externally accessible threaded member 50 (Fig. 3).

The outer end of the quill 17 is provided with a crosshead 51 (Figs. 1 and 2) which has clamped thereto the end of a control rod 52, which is guided in brackets 53 of the frame body B and is provided along its length with a collar 54 which normally is forced toward the right (Figs. 1 and 2) by a spring 55 surrounding the control rod 52 and thus tending always to feed the spline and drill toward the work. The left hand end (Figs. 1 and 2) of the control rod 52 engages in the withdrawn position of the drill with a roller 56 carried by the arm 57 of a switch bridge 58 located within a housing 59. The switch is normally held closed by a spring 60 but is opened by the engagement of the control rod 52 with the roller 56.

The push rod 30 (Fig. 4) on plunger 27 projects externally to the body B and may engage with a roller 61 on an arm 62 pivotally mounted within a switch housing 53 so that the switch bridge 64 is closed upon a predetermined movement of the plunger 27 toward the right (Fig. 4); these contacts being opened again upon leftward movement of the plunger 27 by the return spring 65.

As shown in Figs. 3 and 6, the pivot 34 for planet pinion 35 is reduced in diameter at its ends for engagement in the planetary body 32 and in end plate 33 and is provided with bearing sleeves 66 within the planet pinion 35. The central larger portion of the pivot pin 34 is cut away to provide flat chordal surfaces (Fig. 6) each terminating adjacent one end in a substantially radial surface, whereby notches are provided for the reception of the rollers 67 which cooperate with the flat chordal surfaces of pin 34 and with the internal surface of planet pinion 35 to provide an overrunning clutch.

The gear 41, which preferably is of insulating material, carries thereon a contact member 70 insulated from the machine frame, which is annular in shape and provided with a radial extension 71 (Figs. 1 and 8). Four brushes 72, 73, 74 and 75 cooperate with this contact member 70. One of these brushes (73) is illustrated in Fig. 7 and is shown to comprise a body 80 supported in an insulated plate 81 and provided internally with a passage in which is located a compression spring 82 and a brush 83 with engagement with the extension 71 of the contact member 70 at predetermined times. The plate 81 (Fig. 1) is securely bolted to the frame body E.

In the circuit diagram of Figure 9, the electrical parts of the mechanism are shown as connected to a source of supply comprising the three-phase network having conductors 100. A main switch 101 controls the supply of current by phase conductors 102a, 102b, 102c to the main driving motor M which is belt connected to the pulley 10. One phase conductor 102a is directly connected by a branch conductor 103 to the auxiliary motor A having the armature 20 (Fig. 2). Another phase conductor 102b is connected by a conductor 104 to a contact which may be closed by a normally open bridge 105 of a "reversing" relay which may be closed by the energization of a solenoid 106. The conductor 104 is likewise connected to a contact which may be closed by a normally open bridge 107 of a "forward" relay, which may be closed by energization of a solenoid 108. The third phase conductor 102c is connected by a conductor 109 to a normally open contact which may be closed by a bridge 110 in the "reversing" relay, and also to a normally open contact which may be closed by a bridge 111 in the "forward" relay. The other contact of bridge 111, and the other contact of bridge 105 are connected by a conductor 112 to the auxiliary motor A. The other contact of bridge 107 and the other contact of bridge 110 are connected by conductor 113 to the auxiliary motor A. It will be noted that the inverse connections of the "reversing" and "forward" relays will accomplish the operation of the auxiliary motor A in opposite directions accordingly as the solenoid 106 or 108 is selectively operated.

The phase conductor 102a and conductor 103 are likewise joined by a conductor 114 to a normally open contact controlled by a bridge 115 which may be closed by energization of the solenoid 116 of a "stopping" relay; this conductor 114 is likewise joined to a normally closed contact controlled by a bridge 117 likewise subject to the operation of the solenoid 116. The phase conductor 102c is connected by a conductor 118 to one terminal of the solenoid 116. This "stopping" relay also has a bridge 119 which normally closes a pair of contacts, of which one is joined by a conductor 120 to the second contact of the normally open bridge 115; while the other contact of bridge 119 is joined by conductor 121 to a contact of the normally open but manually operable "trip" switch 122 which is joined at its other contact by a conductor 123 with the phase conductor 100 which is connected to the conductor 102a.

The second contact controlled by bridge 117 is joined by conductor 124 to a normally closed contact of a bridge 125 in the "reversing" relay controlled by solenoid 106. The second contact of bridge 125 is joined by conductor 126 to a normally open contact controlled by bridge 127 under the operation of solenoid 108 of the "forward" relay. The second contact of bridge 127 is connected to the conductor 120, and thus to one terminal of the solenoid 108. The other terminal of the solenoid 108 is joined by a conductor 128 to the conductor 102c. The solenoid 106 is likewise connected to the conductor 102c, and at its other terminal by a conductor 129 with one contact of a normally open but manually closable "reversing" switch 130 which is connected by its other contact and a conductor 131 with a contact of a normally closed bridge 132 in the "forward" relay actuated by solenoid 108 The second contact of bridge 132 is joined by conductor 133 with a normally open contact of a bridge 134 actuated by solenoid 106. The second contact of bridge 134 is joined by the conductor 129. The solenoid 135 of the latching device 44 has one terminal connected by conductor 136 to the phase conductor 102c; the other terminal of solenoid 135 is joined by a conductor 136a to a normally open contact controlled by a bridge 137 of a "latch" relay which bridge has a second contact joined to a bus conductor 138 which is connected to the conductor 113 of auxiliary motor A and to one terminal of the control solenoid 139 of the "latch" relay. A second bridge 140 controlled by solenoid 139 normally holds contacts open, of which one is joined by conductor 141 with the other terminal of the solenoid 139 and also with the brush 75 which operates in conjunction with the extension 71 of rotatable contact piece 70. The second contact of bridge 140 is joined by a bus conductor 145 with the inner brush 72 engaging the rotatable contact piece 70. A normally open contact of the bridge 58 of one limit switch, a normally closed contact of the bridge 64 of the other limit switch and a normally open contact of the manually closable bridge 149 of the "forward" switch are all likewise connected to the bus conductors 45, which itself is connected to the conductor 103 and then to the phase conductor 102a. The other contact of the bridge 64 is joined to conductor 129. The other contact of bridge 58 is joined to conductor 131. The other contact of "forward" switch bridge 149 is joined by a conductor 150 with a second brush 73 cooperating with the extension 71: the conductor 150 also is connected to the other terminal of the solenoid 116. The third brush 74 cooperative with the contact extension 71 is joined to conductor 129.

In operation, when the parts are at a standstill, the motors are de-energized, all relays are open, the latch controlled by a solenoid 135 is disengaged, limit switch 58 is closed and limit switch 64 is open, and the contact extension 71 is resting just to the right or clockwise (Fig. 9) of the brush 73.

When main switch 101 is closed, current flows from the network conductors 100 through the phase conductors 102a, 102b, 102c to the main motor M, and this motor begins to drive the spindle.

The "trip" switch 122 is now depressed to start the cycle. Current now flows from upper conductor 100 (connected to conductor 102a), by conductor 123 to "trip" switch 122 and back by conductor 121 to the normally closed bridge 119 and thence by conductor 120 to solenoid 108 and back by conductor 128 to phase conductor 102c and thus to the line. Solenoid 108 is energized and moves its bridges 107, 111, 127 and 132. A holding circuit is then established from the upper main conductor 100 and phase conductor 102a by conductor 114, normally closed bridge 117, conductor 124, normally closed bridge 125, conductor 126, bridge 127 (now closed), conductor 120, solenoid 108, conductor 128, and back to phase conductor 102c. The opening of "trip" switch 122 therefore does not de-energize the solenoid 108.

The closure of bridges 107, 111, upon the energization of solenoid 108, connects the phase conductors 102b and 102c to the auxiliary motor A, so that the latter now starts rotating at its predetermined speed and drives shaft 24 and through worm 25 moves the worm wheel 31 and the planetary body 32 as a whole. The friction between the end of the toothed projection of spindle 19 and the friction shoe 48 as produced by spring 49, is sufficient so that the spindle 19 and the hollow shaft 18 turn at the same angular speed. Teeth 36 therefore actuate the spline for moving the spindle forward with a rapid initial approach feeding or traverse motion. The rotation of the hollow shaft 18 is transmitted by gear 40 to gear 41, and the contact segment 70 and its extension 71 turn in a counter-clockwise direction (Fig. 1), or clockwise direction arrow (Fig. 9).

During this fast approach feeding of the spindle, a point is reached which by adjustment of the mechanism means a close approximation of the drill to the work. At this point the extension 71 engages brush 75. Current now flows from phase conductor 102a by conductors 103, 145, brush 72, contact ring 70, extension 71, brush 75, conductor 141, solenoid 139, conductor 138, conductor 113, bridge 107, conductor 104, back to phase conductor 102b. Solenoid 139 is energized and closes its bridges 137 and 140.

A further circuit is also closed by energization of the solenoid 139 from phase conductor 102b, by conductor 104, bridge 107, conductors 113, 138, bridge 137, conductor 136a, solenoid 135, conductor 136, back to phase conductor 102c. The energization of solenoid 137 causes an attraction of its plunger and the latch 44 is engaged with ratchet 43 on spindle 19, so that this spindle is brought to and maintained at a standstill.

The auxiliary motor A continues to drive the shaft 24 and thus the planetary body 31. As the auxiliary motor A continues to turn, extension 71 moves away from brush 75. A maintaining circuit, however, remains closed from conductor 145, by bridge 140 and conductor 141 to the solenoid 139. The teeth 39 are now stationary by reason of the operation of latch 44 so that the body 31 produces an angular movement of the pivot pin 34 relative to the spindle 19, and the planet pinion 35 travels on the teeth 39 and by reason of the differential numbers of teeth 37 and 39, the hollow shaft 18 is turned in the same direction as before (clockwise, Fig. 1) and the quill and spindle are fed forward but at a much lesser rate of speed.

As the drill encounters the work and begins to operate thereon, the reaction backward on the spindle is transmitted to the hollow shaft 18 and thus to the planet pinion and to the planetary body 32, and hence to the worm wheel 31. If the reaction thus produced is greater than the thrust exerted by spring 28, the worm 25 tends to thread itself axially on shaft 24, causing a movement of plunger 27 to the right (Fig. 4) until at a pressure controlled by the tension of the spring 28 as regulated by screw device 29, the pin 30 actuates roller 61 to close the overload switch bridge 64.

In Fig. 9, it will be seen that a circuit is now closed from conductor 145, through bridge 64, conductor 129, solenoid 106, conductor 128, back to phase conductor 102c. The first movement in the "reverse" relay caused by energization of solenoid 106 is to open the normally closed bridge 125, so that the holding circuit through solenoid 108 is opened, the "forward" relay opens, and the motor A is deenergized. The "reverse" relay controlled by solenoid 106 is constructed to pass slowly or by steps from the open to the closed position, as by the employment of a mechanical interlock between the "forward" and "reverse" relays, which permits a partial motion of the "reverse" relay to open bridge 125 but prevents the further movement of the "reverse" relay for closing bridges 105 and 110 until the corresponding bridges 107, 111 of the "forward" relay have opened. The closure of this "reverse" relay also establishes a holding circuit for conductor 145, by normally closed bridge 58 of the limit switch conductor 131, normally closed bridge 132 of the "forward" relay, conductor 133, bridge 134 (now closed), conductor 129, to solenoid 106 with a return by conductor 128, to phase conductor 102c. The "reverse" relay is now held in closed position. The opening of the "forward" relay has, however, opened the circuit connections to conductors 112 and 113, and hence current no longer flows from conductor 113 by conductor 138 to the solenoid 139 of the "latch" relay, and the latter opens, and its bridge 137 opens the circuit through the solenoid 135 which controls the latch proper 44. The ratchet 43 is no longer held against rotation.

The auxiliary motor is energized through the "reverse" relay and turns in the opposite direction and drives the shaft 24 and the worm 25 and thus the planetary body 32. The operation of the overrunning clutch parts 67 in conjunction with the pinion 35 prevents rotation of this pinion, and thus a rapid positive withdrawal is accomplished by the action of the teeth on spindle 18 in the rack of the quill. As the extension 71 passes brush 75, during this withdrawal movement, no action occurs.

Ultimately the extension 71 makes contact with brush 73. A circuit is thus closed from conductor 145, brush 72, extension 71, brush 73, conductor 150, solenoid 116, conductor 118, back to phase conductor 102c. The energization of solenoid 116 moves bridges 115, 117 and 119. A circuit is thus established from phase conductor 102a by conductor 114, bridge 115, conductor 120, solenoid 108, conductor 128, back to phase conductor 102c. The energization of solenoid 108 moves bridge 132 to open the circuit through solenoid 106. The slow movement of the "forward" relay or the aforesaid mechanical interlock operates to restrict the movement of bridges 107, 111 until the "reverse" relay has fully opened to disconnect the energization of the auxiliary motor A for reverse motion, and then permits further movement of these bridges to close circuits between conductors 104, 109 and conductors 112, 113 for the forward motion of auxiliary motor A. The extension 71 now moves back again and passes off brush 151, thereby opening the circuit through conductor 150 and de-energizing solenoid 116. Bridge 115 opens and solenoid 108 is de-energized and hence the auxiliary motor A comes to a standstill in the initial position set out above.

A similar withdrawal operation occurs when the drill has been fed forward to its limit of travel so that the extension 71 engages brush 74. That is, a circuit is established from conductor 145 to brush 72, extension 71, brush 74, conductor 129, through solenoid 106 to accomplish the closure of the "reverse" relay as before.

The normally open hand switch 149 is provided to "jog" the motor forward or cause it to advance slowly by steps into a desired position. When switch 149 is closed, a circuit is formed from conductor 145 through bridge 149, conductor 150, solenoid 116, conductor 118, to phase conductor 102c. Bridge 115 (closed by energizing solenoid 116) closes an energizing circuit for solenoid 108 which continues as long as this bridge is closed, i. e. so long as switch 149 is in closed position. This is a desirable feature for setting the tools and devices into properly related positions.

The motor may be reversed at any part of the cycle to fully withdraw the drill regardless of the position of the spindle, and without the engagement of brush 74 or the closure of the overload switch bridge 64. This is done by a manually operable "reverse" switch having a bridge 130. Upon closing this bridge, current flows by conductor 145, limit switch bridge 58, conductor 131, bridge 130, conductor 129, solenoid 106, conductor 128, back to phase conductor 102c. If bridge 130 is released before the spindle is fully retracted or withdrawn, the aforesaid holding circuit through bridge 134 maintains the solenoid 106 energized. The "forward" relay solenoid circuit is opened at bridge 125 as before. The spindle is thus returned to the initial position. Upon attaining the initial position, limit switch bridge 58 is opened so that the control of the mechanism is removed from bridge 130. In this connection also, it will be noted that if a proper contact is not made for some reason, between extension 71 and brush 73, during the withdrawal movement, the motor continues in reverse until the limit switch 58 operates to de-energize solenoid 106.

In the modified circuit arrangement shown in Figure 9a, most of the connections are similar to those provided in the diagram of Figure 9 and corresponding reference numerals are employed. In the form shown in Fig. 9, bridges 125 and 132 are provided on the "forward" and "reverse" relays; while in the diagram of Figure 9a, a separate "supervising" relay is provided having an energizing solenoid 160 and the bridge 125a which normally closes a circuit between conductors 124 and 126 and thus has the same function as bridge 125 in Fig. 9. The "trip" relay under control of solenoid 116 has a further bridge 132a which normally closes a circuit between conductors 131 and 133 and thus has the same function as bridge 132 in Fig. 9.

Correspondingly, conductor 129 is connected to one contact of switch bridge 64, brush 74, one contact of the "reverse" switch 130 and a normally open contact of bridge 161 in the "supervising" relay. Conductor 129a which connects one terminal of solenoid 106 of the "reverse" relay is connected to a normally open contact of bridge 134, and to the other normally open contact of bridge 161. Conductor 128 is connected as before with solenoid 106 and 108 and in Fig. 9 is also extended to the solenoid 160 which at its other end is connected to conductor 129.

The operation of the apparatus with this circuit connection is substantially as before in function. When the extension 71 encounters brush 74 or when the overload limit switch 64 is closed, current flows from the bus conductor 145 to the conductor 129. This circuit then continues through the solenoid 160 to conductor 128. The energization of solenoid 160 causes an immediate opening at bridge 125a between conductors 124 and 126, and the solenoid 108 of the "forward" relay is de-energized, and this relay opens so that the motor will come to a standstill after a very few revolutions. The "supervising" relay also closes its bridge 161 and thus establishes a further circuit from conductor 129 through conductor 129a for energizing the solenoid 106 of the "reverse" relay. This "reverse" relay now closes and establishes its own maintaining circuit for solenoid 106; and also connects the motor A for operation in the reverse direction with the same results as before. As extension 71 leaves brush 75, or the overload limit switch bridge 64 opens, conductor 129 is de-energized along with the solenoid 160. Bridge 161 opens the initiating circuit to solenoid 106 but this solenoid is now being energized through its maintaining circuit. Bridge 125a of the "supervising" relay closes a tentative circuit through conductors 124 and 126 which is completed as a holding circuit for the solenoid 108 of the "forward" relay whenever this solenoid is again energized.

It is obvious that many changes in the construction may be made, while maintaining the same function and inter-relationship of the major elements, without departure from the scope of the appended claims.

What is claimed and desired to secure by Letters Patent is—

1. In a device of the class described, the combination of a frame, a tool support reciprocable relative to said frame, a planetary body, gears coaxial with said body and having different numbers of teeth, gear means rotatably mounted on said body and in mesh with said gears, means for rotating said body, a detent mounted on the frame for holding one said gear against rotation, a connection between the other gear and said support for reciprocating the latter, and means controlled by the position of the element relative to the frame actuated upon predetermined movements of said other gear for effecting the engagement of said detent during the course of movement of said support in one direction and disengagement of said detent at the end of such movement in said one direction.

2. In a device of the class described, the combination of a frame, a tool holder reciprocable relative to the frame, means for reciprocating the tool holder including a planetary body and means to drive the same, gears having different numbers of teeth and coaxial with said body, gear means rotatable about an axis on said body and in mesh with said gears, a ratchet secured to one said gear, a latch, means operated by the other gear to reciprocate said tool holder, and means controlled by the position of said tool holder during its feeding movement toward the work for engaging said latch with said ratchet for holding the latter against rotation.

3. In a device of the class described, the combination of a frame, a tool holder reciprocable relative to the frame, means for reciprocating the tool holder including a planetary body and means to drive the same, gears having different numbers of teeth and coaxial with said body, gear means rotatable about an axis on said body and in mesh with said gears, a ratchet secured to one said gear, a latch, means operated by the other gear to reciprocate said tool holder, electromagnetic means for engaging said latch with said ratchet, and circuit means including a circuit closing device having a contact moving with said tool holder for energizing said electromagnetic means at a predetermined position of feeding movement.

4. In a device of the class described, the combination of a frame, a tool holder reciprocable relative to the frame, means for reciprocating the tool holder including a planetary body and means to drive the same, gears having different numbers of teeth and coaxial with said body, gear means rotatable about an axis on said body and in mesh with said gears, a ratchet secured to one said gear, a latch, means operated by the other gear to reciprocate said tool holder, electromagnetic means for engaging said latch with said ratchet, a contact member rotated by said other gear, a cooperating contact member, and circuit means for connecting said electromagnetic means and contact members.

5. In a device of the class described, the combination of a frame, a tool holder reciprocable relative to said frame, a motor operatively connected to reciprocate said tool holder through a planetary transmission, a releasable latch for controlling said transmission and effecting rapid or slow reciprocating movement accordingly as said latch is released or engaged, a forward relay, a reverse relay, contact means controlled by the position of the tool holder and closed as the tool approaches the work, switch means for causing said forward relay to effect energization of said motor, electromagnetic means for engaging said latch, connections between said contact means and latch for engaging said latch, and further contact means and connections therewith for de-energizing said latch when said forward relay is opened.

6. In a device of the class described, the combination of a frame, a tool support reciprocable relative to said frame, a planetary body, gears coaxial with said body and having different numbers of teeth, gear means rotatably mounted on said body and in mesh with said gears, means for rotating said body, a detent mounted on the frame for holding one said gear against rotation, friction means for causing said gears to rotate together when said detent is disengaged, a connection between the other gear and said support for reciprocating the latter, and means for engaging and disengaging said detent whereby to produce different speeds of reciprocation of said support.

7. In a device of the class described, the combination of a frame, an element reciprocable relative to the frame, a planetary gearing including a rotatable body, two gears having different numbers of teeth, pinion means on said body and engaged with said gears, power driving means for said body, means operated by one said gear for moving said element, a releasable detent mounted on the frame for holding the other said gear against movement, friction means for causing said gears to turn together when said detent is released, a control member driven by said one gear, and means energized by said control member for engaging and disengaging said detent.

8. In a device of the class described, the combination of a frame, a tool holder reciprocable relative to the frame, means for reciprocating the tool holder including a planetary body and power means to drive the same, two gears, planet pinion means eccentrically mounted on said planetary body and in mesh with said two gears, detent means for holding one said gear against rotation so that the planetary body then operates through the pinion means for effecting movement of the other gear at a slow rate while the pinion means is being rotated in one direction, and means for preventing rotation of said pinion means in the other direction and thereby causing said gears to turn together, said reciprocating means including a connection from the other gear to the tool holder.

9. In a device of the class described, the combination of a frame, a tool holder reciprocable relative to the frame, means for reciprocating the tool holder including a planetary body and means to drive the same, two gears, planet pinion means eccentrically mounted on said planetary body and in mesh with said two gears, detent means for holding one said gear against rotation so that the planetary body operates through the pinion means for effecting movement of the other gear at a slow rate while the pinion means is being rotated in one direction, means for preventing rotation of said pinion means in the other direction and thereby causing said gears to turn together, said reciprocating means including a connection from the other gear to the tool holder, and a device for causing said gears to turn together during rotation of the pinion means in said one direction so long as the said detent means is disengaged.

10. In a device of the class described, the combination of a frame, a tool holder reciprocable relative to the frame, and reversible means for reciprocating the tool holder including a planetary body and a reversible source of power to drive the same, planet pinion means eccentrically journalled on the body and in mesh with said gears, a releasable detent means for holding one of said gears against movement, a spring, and friction means on said one gear and body urged to engaged position by said spring and thereby operating to cause said one gear to turn with the body when said detaining means is released and operating to permit relative movement thereof when said detaining means is engaged, and means connecting the other said gear with the tool holder.

11. A device as in claim 10, in which said releasable detent means includes devices for holding the same out of detaining position during a first part of the forward movement of the tool so that the planetary body and gears are connected by the friction means to turn at like speeds and the tool holder is advanced rapidly, and thereafter operating to hold the said one gear against movement so that the planetary body and other gear move at different speeds to advance the tool slowly, and overrunning clutch means for preventing relative movements of said planetary body and gears during the reverse movement of said reversible means for the withdrawal of the tool for effecting a positive return movement of the tool holder.

12. In a device of the class described, the combination of a frame, a tool holder reciprocable relative to said frame, means for reciprocating said tool holder including a reversible source of power, a pair of shafts and differentiating gear means for connecting said shafts and the source, detent means for selectively holding one said shaft against movement, means connecting the other said shaft to the tool holder, a selective contact member rotated with said other shaft, three cooperating contact members, and circuit means connecting said contact members and operative successively for producing a forward movement of the source for moving the tool holder rapidly, thereafter for engaging said detent means for effecting a slow movement of the tool holder through said differentiating gearing, and thereafter for producing a reverse movement of the source for moving the tool holder rapidly back to withdrawn position.

13. In a device of the class described, the combination of a frame, a tool support reciprocable relative to said frame, a planetary body, first and second gears coaxial with said body and having different numbers of teeth, a shaft fixed on said body eccentric to said gears, connected gear members rotatable on said shaft and in mesh with said gears, power means for rotating said body in forward and reverse directions, a connection between said first gear and said support for reciprocating the latter, a detent for holding said second gear against rotation during the forward drive for compelling relative rotation of said body and gear means whereby said first gear is revolved at a speed slower than that of said planetary body, an overrunning clutch for resisting a backward movement of the gears relative to the planetary body whereby said first gear is revolved at the speed of said planetary body when said detent is released from said second gear.

14. In a device of the class described, the combination of a frame, an element reciprocable relative to the frame, a differentiating gearing having three relatively movable members, reversible means for driving one of said members, means connecting a second of said members with said element to reciprocate the same, a releasable detent for the third of said members, friction means for causing said members to turn together when said one member is driven in one direction and the detent is inoperative, positive clutch means for causing said members to turn together when said one member is driven in the other direction and the detent is operative, said detent operating upon engagement while said one member is driven in said one direction to effect a change of the rate of movement of said element, and devices for selectively engaging and disengaging said detent and for reversing said reversible means.

15. In a device of the class described, the combination of a frame, an element reciprocable relative to the frame, a planetary gearing including a rotatable body, two gears having different numbers of teeth, and pinion means on said body and engaged with said gears, power driving means for said body, means operated by one said gear for moving said element, a releasable detent mounted on the frame for holding the other said gear against movement, automatically operating means for causing said gears to turn together when said detent is released, and means operated upon a predetermined movement of the element for engaging and disengaging said detent whereby to change the speed of movement of said element.

16. In a device of the class described, the combination of a frame, an element reciprocable relative to the frame, a planetary gearing including two gears having different numbers of teeth, and a body having pinion means connecting said gears, means operated by one said gear for moving said element, a releasable detent for holding the other said gear against movement, adjustable friction means between said other gear and the body for causing said body and gears to turn together when said detent is released, means engaging with and operable for rotating said body, and means operated upon a predetermined movement of the element for engaging and disengaging said detent whereby to change the speed of movement of said element.

17. In a device of the class described, the combination of a frame, an element reciprocable relative to the frame, a reversible electric motor for reciprocating said element at high and at low speeds, differentiating gearing including a body, sun gears and pinion means carried by the body, one sun gear being connected for moving said element and said body being connected for driving by said motor, a detent for holding said other sun gear against rotation, control means operative for engaging and disengaging said detent, a contact member moving with said element, cooperating contact members positioned for engagement with said moving contact member when the element is at either end of a predetermined stroke, and during an intermediate position of movement from one end toward the other, means including circuits closed by said contact members for energizing said motor and control means for causing the element to make a rapid initial movement and a slow final movement in one direction and a rapid movement in the other direction, and means responsive to reaction pressure on said element for reversing the direction of rotation of said motor.

18. In a device of the class described, a frame, an element movable back and forth relative to the frame, a reversible source of power, means driven by said source for moving the element back and forth in accordance with the direction of energization of said source, said moving means including gearing for producing a rapid and a slow movement of said element, electromagnetically operated means for selecting the operation of said gearing for said slow movement, said moving means also including devices for selecting the operation of said gearing for said rapid movement when said electromagnetically operated means is de-energized, circuit control means and associated circuit means operated by the said element during its forward and reverse movements for reversing the energization of said source, further circuit means connected with said associated circuit means and said electromagnetically operated means for de-energizing said electromagnetically operated means when the source is energized for reverse movement of the carriage, and a circuit closer for energizing said further circuit means.

19. In a device of the class described, a frame, an element movable back and forth relative to the frame, a reversible source of power, means driven by said source for moving the element back and forth in accordance with the direction of energization of said source, said moving means including gearing for producing a rapid and a slow movement of said element, electromagnetically operated means for selecting the operation of said gearing for said slow movement, said moving means also including devices for selecting the operation of said gearing for said rapid movement when said electromagnetically operated means is de-energized, circuit control means and associated circuit means operated by the said element during the forward and reverse movements for reversing the energization of said source, further circuit means for energizing said electromagnetically operated means, a circuit closer for energizing said further circuit means controlled by the element for closure at a predetermined position of forward movement thereof, and devices included in said associated circuit means for holding said further circuit means and electromagnetically operated means de-energized during the energization of the source for reverse movement.

20. In a device of the class described, a frame, an element movable back and forth relative to the frame, a reversible feed motor, forward and reverse relays for connecting the motor for forward and reverse movements, feed mechanism driven by said motor for moving the element back and forth and including devices for producing fast and slow movements thereof, a solenoid and means operated thereby for selectively controlling said devices to produce a slow forward movement upon energization of the solenoid, said devices cooperating to produce a fast movement when said solenoid is de-energized, a circuit for energizing said solenoid, circuit means for energizing said forward and reverse relays and including contacts of said relays to provide maintaining circuits for each relay which are closed while the corresponding relay is closed and the other relay is open, and circuit closure means operated with the movement of said element for effecting initial energization of said forward and reverse relays at withdrawn and advanced positions of said element and for energizing said solenoid circuit during the course of the forward movement of the element, said solenoid energizing circuit including a maintaining branch controlled by said forward and reverse relays so that the solenoid is de-energized upon energization of the reverse relay.

21. In a device of the class described, the combination of a frame, a tool support reciprocable relative to said frame, a planetary body, two gears coaxial with said body and having different numbers of teeth, gear means rotatably mounted on said body and in mesh with said gears, means for rotating said body, a detent for holding one said gear against rotation, a connection between the other gear and said support for reciprocating the latter, means actuated upon predetermined movements of said other gear for effecting the engagement of said detent during the course of movement of said support in one direction and disengagement of said detent at the end of such movement in said one direction, and means responsive to the tool pressure for likewise effecting the disengagement of said detent and a reversal of said rotating means.

22. In a device of the class described, a frame, a tool holder reciprocable relative to the frame, power means for reciprocating said tool holder, said power means including a reversible motor and a train of gears including differentiating gearing consisting of a driving member connected to the motor, a driven member connected to the tool holder, and a third member, devices for controlling the differentiating gearing and including a detent cooperative with the third member for releasing and holding the same and thereby changing the speed between a rapid traverse rate and a slow feed rate, a solenoid for selectively operating said detent to change the rate, and control switches operated upon the movement of the tool holder for controlling the energization of the solenoid and the direction of energization of the power means.

23. In a device of the class described, the combination of a frame, an element reciprocable relative to the frame, a reversible motor, means actuated by the motor for reciprocating said element at high and at low speeds including a differentiating gear train consisting of a driving member connected to the motor, a driven member connected to the element, and a third member, a detent operative when engaged with the third member for causing said train to produce a low speed, means operative when the detent is disengaged for causing all said members to turn together for producing a high speed, reversing means responsive to the reaction against forward movement of said element for causing a reversal of the motor and a rapid withdrawal of said element, reversing means operated by said element at the end of its withdrawal movement for again reversing the motor, means included in said reciprocating means and operated by said element during its rapid forward movement for effecting a movement of the detent into engagement with the third member, and limit means operated by the element at the end of its predetermined maximum forward movement for causing a final reversal of said motor and a return of said element to and its maintenance in withdrawn position.

24. A device of the class described comprising a frame, a member to be advanced relative to the frame, a revoluble element providing a planetary body and means for driving the same, planet pinion means eccentrically mounted on said planetary body, two sun gears each in mesh with said planet pinion means, devices connecting said one sun gear with said member to advance the same, constantly operating friction means for causing said body to turn one said sun gear and move said devices and advance said member at a fast rate so long as the resistance opposed to advancement of said member is less than a predetermined maximum, said friction means slipping when said maximum resistance is exceeded, means for adjusting said friction means for determining said maximum resistance, said body, pinion means and sun gears being constructed and arranged for producing a relative forward movement of the said one sun gear relative to the other said sun gear upon slippage of said friction means, and means for preventing retrograde movement of said other sun gear relative to said frame whereby to cause a slow rate of advancement of said member by said devices.

EDWARD JOSLIN KINGSBURY.